United States Patent
Singh et al.

(10) Patent No.: US 12,183,118 B2
(45) Date of Patent: Dec. 31, 2024

(54) FACIAL RECOGNITION ADVERSARIAL PATCH ADJUSTMENT

(71) Applicant: NEC Corporation, Tokyo (JP)

(72) Inventors: Inderjeet Singh, Tokyo (JP); Toshinori Araki, Tokyo (JP)

(73) Assignee: NEC Corporation, Tokyo (JP)

( * ) Notice: Subject to any disclaimer, the term of this patent is extended or adjusted under 35 U.S.C. 154(b) by 490 days.

(21) Appl. No.: 17/535,598

(22) Filed: Nov. 25, 2021

(65) Prior Publication Data

US 2023/0162530 A1 May 25, 2023

(51) Int. Cl.
*G06V 40/16* (2022.01)
*G06F 18/21* (2023.01)
*G06F 18/22* (2023.01)
*G06V 10/44* (2022.01)

(52) U.S. Cl.
CPC .......... *G06V 40/172* (2022.01); *G06F 18/217* (2023.01); *G06F 18/22* (2023.01); *G06V 10/44* (2022.01); *G06V 40/162* (2022.01); *G06V 40/171* (2022.01)

(58) Field of Classification Search
CPC .. G08B 13/19686; G06T 11/60; G06V 20/52; G06V 40/172; G06V 10/62; H04L 9/323; H04L 9/0643; H04L 9/0662; H04L 9/0866; H04L 9/0891; G06F 18/251
See application file for complete search history.

(56) References Cited

U.S. PATENT DOCUMENTS

| | | | |
|---|---|---|---|
| 2020/0053262 A1* | 2/2020 | Wexler | G06V 20/30 |
| 2021/0300433 A1* | 9/2021 | Vorobeychik | G06V 10/751 |
| 2023/0005111 A1* | 1/2023 | Fan | G06V 10/82 |

FOREIGN PATENT DOCUMENTS

| | | | |
|---|---|---|---|
| CN | 111340008 A | * | 6/2020 |
| JP | 202160872 A | | 4/2021 |
| WO | 2020121450 A1 | | 6/2020 |
| WO | 2020165935 A1 | | 8/2020 |
| WO | 2021144841 A1 | | 7/2021 |

OTHER PUBLICATIONS

Komkov ("Advhat: Real-world adversarial attack on arcface face id system." In 2020 25th international conference on pattern recognition (ICPR), pp. 819-826. IEEE, Jan. 10, 2021) (Year: 2021).*

(Continued)

*Primary Examiner* — Edward F Urban
*Assistant Examiner* — Wassim Mahrouka
(74) *Attorney, Agent, or Firm* — HAUPTMAN HAM, LLP (57) ABSTRACT

Facial recognition adversarial patch adjustment is performed by applying a patch to a digital image including image data representing a face to obtain a patched image, applying a face detector to the patched image to obtain a detection value representing a likelihood that the patched image includes image data representing facial features, applying a feature extractor to the patched image to obtain a feature vector, applying a similarity determiner to the feature vector and a target feature vector to obtain a similarity value representing a likelihood that the patched image includes image data representing a target face, calculating a loss based on the detection value and the similarity value, and adjusting the patch based on the loss.

17 Claims, 7 Drawing Sheets

(56) References Cited

OTHER PUBLICATIONS

Goodfellow et al., "Explaining and harnessing adversarial examples" arXiv preprint arXiv:1412.6572 (2014), Published as a conference paper at ICLR 2015. 11pp.
Guo et al., "Meaningful Adversarial Stickers for Face Recognition in Physical World" arXiv preprint arXiv:2104.06728 (2021) 10pp.
Madry et al., "Towards deep learning models resistant to adversarial attacks" arXiv preprint arXiv:1706.06083 (2017), last revised Sep. 4, 2019 (this version, v4) 28pp.
Zhang et al., "Joint face detection and alignment using multitask cascaded convolutional networks" IEEE Signal Processing Letters vol. 23. No. 10, Oct. 2016: 1499-1503. 5pp.
Kaziakhmedov et al., "Real-world adversarial attack on MTCNN face detection system" 2019 International Multi-Conference on Engineering, Computer and Information Sciences (Sibircon). IEEE, 2019, last revised Apr. 2, 2020 (this version, v2) 6pp.
Yang et al., "Design and interpretation of universal adversarial patches in face detection" Computer Vision—ECCV 2020: 16th European Conference, Glasgow, UK, Aug. 23-28, 2020, Proceedings, Part XVII 16. Springer International Publishing, 2020. 20pp.
Thys et al., "Fooling automated surveillance cameras: adversarial patches to attack person detection" Proceedings of the IEEE/CVF Conference on Computer Vision and Pattern Recognition Workshops. 2019. 7pp.
Cao et al., "VGGFace2: A dataset for recognising faces across pose and age" 2018 13th IEEE international conference on automatic face & gesture recognition (FG 2018). IEEE, 2018. 11pp.
Hu et al., "Squeeze-and-excitation networks." Proceedings of the IEEE/CVF conference on computer vision and pattern recognition, 2018. 11pp.

\* cited by examiner

FACIAL RECOGNITION ADVERSARIAL PATCH ADJUSTMENT

BACKGROUND

In modern Face Recognition Systems (FRSs), deep learning-based facial recognition validates a claimed identity from an input image against a reference image by calculating and comparing deep representative features. In some instances, a FRS pipeline includes a face detection phase and a face feature extraction phase. Face detection is the process of determining a probability of presence and the location of a face in a given area of the input image. Face feature extraction is the process of extracting unique representative features from an input face image using pre-trained deep-learning models. Feature-extractor-based systems are scalable once deployed because the systems are operable for new identities without retraining. A threshold is used in these systems to classify the deep features of the input images. End-to-end classifiers are also used in environments with a fixed number of face identities, or environments where the computational complexity is not of significant importance.

In some instances, a FRS receives a to be verified input face image either digitally or by capturing the subject through a camera. The input image with the face is then passed to the face detection phase in the FRS for preprocessing and otherwise making the input image appropriate for the feature extractor. The face detector determines the presence of the face, the location of the face, and the size of the face. If a face is detected in the input image, then the face detector performs alignment and cropping transformation. The aligned and cropped face image is then fed to a feature extractor, which extracts the deep representative features of the face image. To validate the claimed identity, the deep features are then compared with the deep features of the reference images in the system by a face classifier. The reference images are pre-registered in the system, or a reference image can be input at the verification time, such as in the case of face verification systems.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

Deep neural networks of at least some FRSs are vulnerable to well-designed input images called adversarial examples (AXs). Vulnerability to AXs is risk for applying deep neural networks (DNNs) in safety-critical environments like face verification systems (FVSs). Risk evaluation of existing learning-based FRS s focuses on using strong adversarial attacks, which is an attack on computer systems using AXs. Adversarial attacks on FRSs are from the digital and/or physical worlds, and are referred to as digital and physical adversarial attacks, respectively.

Two types of adversarial attacks are impersonation and evasion. In impersonation attacks, an input image is perturbed in such a way that the input image is classified as a target identity's image by the target FRS. Physical impersonation attacks include generating a patch noise in the form of a physical object, such as a hat, a pair of glasses, etc. In evasion attacks, an input image is perturbed in such a way that the target FRS does not classify the input image as the registered image, or gallery image, of the same identity as the input image. In short, an impersonation AX is classified as a target identity instead of the true identity, and an evasion AX hides or misrepresents the true identity from the target FRS. AXs are crafted as white-box, gray-box, and black-box, depending upon the level of access to the target FRS's information and algorithms. A white-box AX is crafted with complete information of the target FRS. A gray-box AX is crafted with partial information of the target FRS. A black-box AX is crafted with no information of the target FRS.

Some techniques of generating AXs on fooling either the face detector of an FRS or the feature extractor and face classifier of the FRS. In some techniques for fooling a feature extractor and face classifier, digital or physical AXs are generated for use in applying real-world adversarial stickers to a face. In some techniques, optimal locations of the sticker on the face of a subject are found such that the adversary's objective is achieved without modifying patterns in the sticker. In some techniques, optimization focuses on fooling face detectors only without regard to fooling feature extractors or deep feature matching-based face classifiers.

Under some techniques, optimization of fooling feature extractors and face classifiers leads to compatibility issues with face detectors. In other words, by modifying a face too much for the purpose of impersonation, the modified face might not be recognized by the face detector as a face at all, which does not achieve the adversary's objective, despite the modification working successfully on a face classifier. Optimization of fooling face detectors without regard to feature extractors and face classifiers can lead to unrealistic solutions, such as oversized patches.

In some techniques for fooling a feature extractor and face classifier, the size of the adversarial patch is constrained because larger patches decrease the detectability of the face. In some techniques of impersonation or dodging attacks, successful detection of the face by the face detector is required, which limits either the size of the patch or the color deviation range of pixels of the patch, particularly with imperceptible noise attacks, in which the color deviation is small enough to avoid perception of the patch by a human viewer. As the size of the patch or the range of the patch's pixels decrease, the probability of a successful attack against a feature extractor and face classifier decreases, due to the reduction in feasible solution space for the adversarial noise patterns. As the size of the patch increases, the feasible solution space increases, leading to robust AXs against feature extractors and face classifiers with faster convergence, but the probability of successful face detection decreases.

In at least some embodiments herein, AXs are optimized with respect to both face detection and face classification. In at least some embodiments herein, constraints on the size of the patch containing the adversarial noise while attacking a practical FRS are relaxed, resulting in increased solution space, and resulting in a solution that successfully achieves the adversary's objective with respect to the face detector and the feature extractor and face classifier.

In at least some embodiments herein, AXs are generated that jointly fool face detection and feature extractors and face classifiers, in end-to-end or deep feature-based classification. In at least some embodiments, an apparatus simultaneously controls detection probability and a predicted class by a target FRS, for the generated AXs. In at least some embodiments, the apparatus increases or decreases detectability of the face present in an AX while satisfying misclassification (impersonation or dodging from feature-extractor-based classification) objectives. In at least some embodiments, the apparatus has theoretical potential to generate a successful adversarial patch of any shape and size within an input image.

In at least some embodiments, an adversarial patch is a region of arbitrary size and shape of adversarial noise inside a face region of an input image. In at least some embodiments, the adversarial noise is adjusted to increase the possibility of causing misclassification by a target deep learning-based system. In at least some embodiments, adversarial patch noise can be added to a face region of an input image in the following two manners:

$$AX = F + P_{small} \qquad \text{EQ. 1}$$

$$AX = F*M_f + P*(1-M_f) \qquad \text{EQ. 2}$$

where AX is the input image with adversarial noise, F is the unperturbed input image, $P_{small}$ is imperceptibly tiny noise, i.e., with minimal and close to zero pixel range compared to the pixels of F, $M_f$ is a mask for the face, and used for the replacement of pixels in the face region of the input image with the adversarial patch P's pixels. In at least some embodiments, the elements in the $M_f$ mask matrix have a value of 0 for pixels inside the patch region and a value of 1 for the remaining pixels. In at least some embodiments, adversarial patches take any shape inside the input image and also cover any area ranging from a single pixel to all pixels of the input image. In at least some embodiments, the pixel value range is defined based on an objective.

In at least some embodiments, losses for the adversary's objectives for the detection and classification phase are combined during the attack generation process, which involves iterative gradient-based optimization of the combined adversarial loss functions for the detection and classification phase of an FRS.

Figure 1:
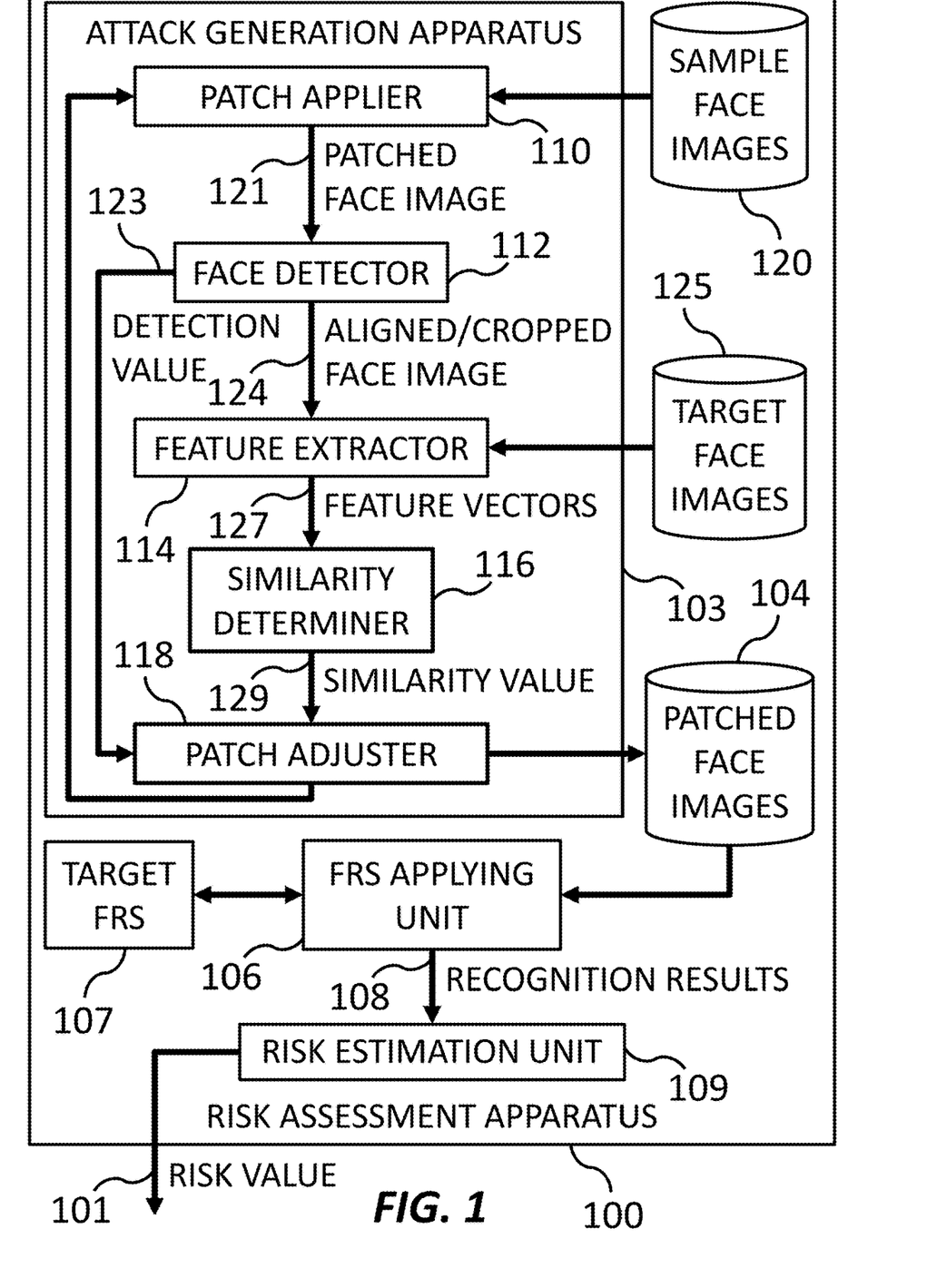
FIG. 1 is a schematic diagram of an apparatus for facial recognition system risk assessment, according to at least some embodiments of the subject disclosure.

FIG. 1 is a schematic diagram of an apparatus 100 for facial recognition system risk assessment, according to at least some embodiments of the subject disclosure. Risk assessment apparatus 100 includes an attack generation apparatus 103, an FRS applying unit 106, and a risk estimation unit 109. Risk assessment apparatus 100 further includes patched face images 104, target FRS 107, sample face images 120, and target face images 125. In at least some embodiments, risk assessment apparatus 100 is a desktop computer, a notebook computer, a handheld computer, a server, a plurality of servers, a portion of a server, a virtual instance of cloud computing, etc.

Attack generation apparatus 103 includes a patch applier 110, a face detector 112, a feature extractor 114, a similarity determiner 116, and a patch adjuster 118. In at least some embodiments, attack generation apparatus 103 is the circuitry or software integrated with risk assessment apparatus 100 configured for facial recognition adversarial patch adjustment. In at least some embodiments, attack generation apparatus 103 is a separate apparatus configured to exchange data with risk assessment apparatus 100.

In at least some embodiments, patch applier 110 is configured to receive sample face images 120, apply patches, and produce patched face images, such as patched face image 121.

In at least some embodiments, face detector 112 is configured to detect whether a face exists in images, such as in patched face image 121, and produce aligned and cropped face images, such as aligned and cropped face image 124. In at least some embodiments, face detector 112 is configured to produce a detection value 123 representing the probability that a face exists in the image. In at least some embodiments, face detector 112 is configured to determine that a face exists in the image in response to determining that the detection value is greater than a reference value. In at least some embodiments, face detector 112 is configured to align and crop images so that a face is centered, oriented, and occupies a normalized amount of space in the image in response to determining that a face exists in the image.

In at least some embodiments, feature extractor 114 is configured to extract one or more feature vectors, such as feature vectors 127, from aligned and cropped face images, and from target face images 125. In at least some embodiments, feature vectors are deep, encoded, representative features of a face in an image used for comparison with other feature vectors to determine similarity in the appearance of faces. Feature vectors are interpretable or non-interpretable.

In at least some embodiments, similarity determiner 116 is configured to determine the similarity in the appearance of faces based on the feature vectors extracted therefrom, and produce similarity values, such as similarity value 129, quantifying the similarity. In at least some embodiments, similarity determiner 116 is configured to determine the similarity between feature vectors of aligned and cropped face image 124 and target face images 125. In at least some embodiments, similarity determiner 116 is a face classifier.

In at least some embodiments, face detector 112, feature extractor 114, and similarity determiner 116 are from an existing FRS. In at least some embodiments, face detector 112, feature extractor 114, and similarity determiner 116 are all components of target FRS 107. In at least some embodiments, one or more of face detector 112, feature extractor 114, or similarity determiner 116, but not all, are components of target FRS 107. In at least some embodiments, none of face detector 112, feature extractor 114, or similarity determiner 116, are components of target FRS 107.

In at least some embodiments, patch adjuster 118 is configured to adjust values of a patch based on the associated detection value and the associated similarity value. In at least some embodiments, patch adjuster 118 adjusts values according to a Projected Gradient Descent (PGD) method. In at least some embodiments, patch adjuster 118 records optimized patched face images 104.

In at least some embodiments, FRS applying unit 106 is configured to apply target FRS 107 to one or more patched face images 104 to obtain facial recognition results 108. In at least some embodiments, FRS applying unit communicates with target FRS 107 across a network for application to patched face images 104. In at least some embodiments, FRS applying unit 106 applies target FRS 107 through physical interaction and sensors configured to detect results from target FRS 107.

In at least some embodiments, risk estimation unit 109 is configured to estimate a risk value 101 for target FRS 107 based on recognition results 108.

Figure 2:
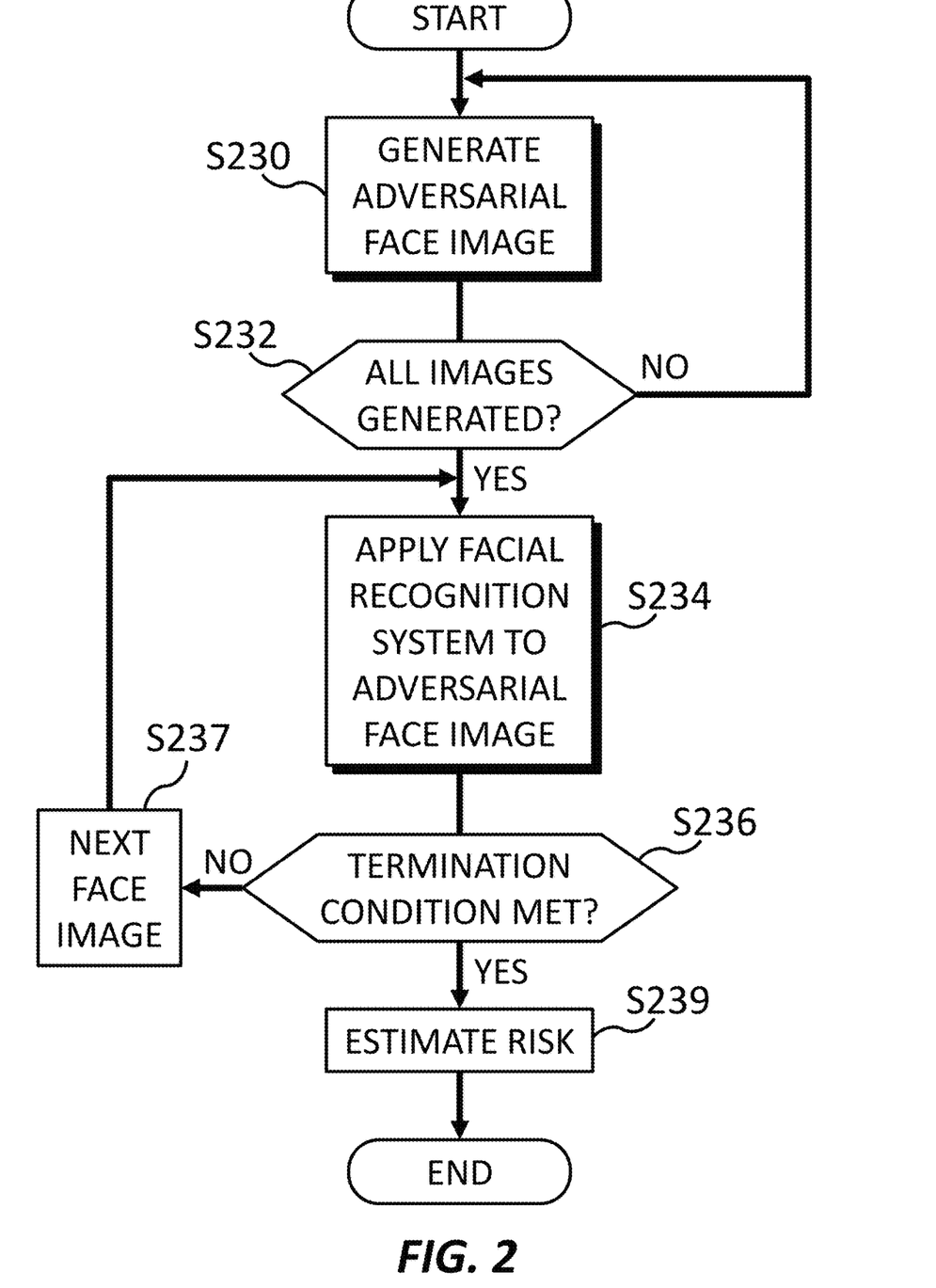
FIG. 2 is an operational flow for facial recognition system risk assessment, according to at least some embodiments of the subject disclosure.

FIG. 2 is an operational flow for facial recognition system risk assessment, according to at least some embodiments of the subject disclosure. The operational flow provides a method of facial recognition system risk assessment. In at least some embodiments, one or more operations of the method are executed by a controller of an apparatus including sections for performing certain operations, such as the controller and apparatus shown in FIG. 9, which will be explained hereinafter.

Figure 3:
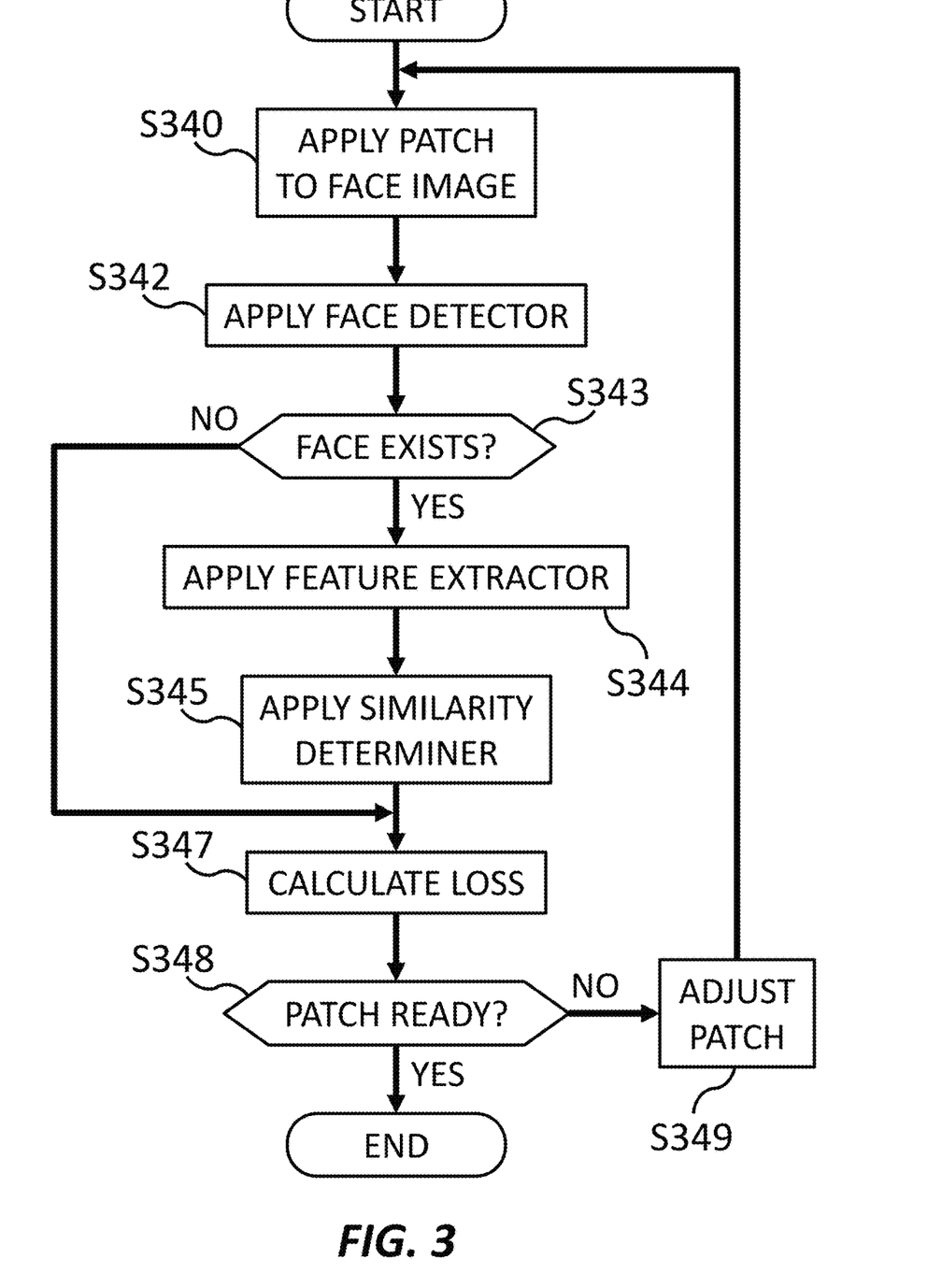
FIG. 3 is an operational flow for facial recognition adversarial patch adjustment, according to at least some embodiments of the subject disclosure.

At S230, a generating section generates an adversarial face image. In at least some embodiments, the generating section generates an adversarial face image by applying a patch to a face image. In at least some embodiments, the generating section performs facial recognition adversarial patch adjustment to improve the likelihood of successfully fooling an FRS. In at least some embodiments, the adversarial face image generation proceeds as shown in FIG. 3, which will be explained hereinafter.

At S232, the controller or a sub-section thereof determines whether all adversarial face images have been generated. In at least some embodiments, the generating section generates adversarial face images for a plurality of face images representing faces having a diverse set of features. In at least some embodiments, accuracy of risk value increases as the number of adversarial face images increases. If the controller determines to generate more adversarial face images, then the operational flow proceeds to FRS application at S234. If the controller determines that all adversarial face images have been generated, then the operational flow ends.

Figure 4:
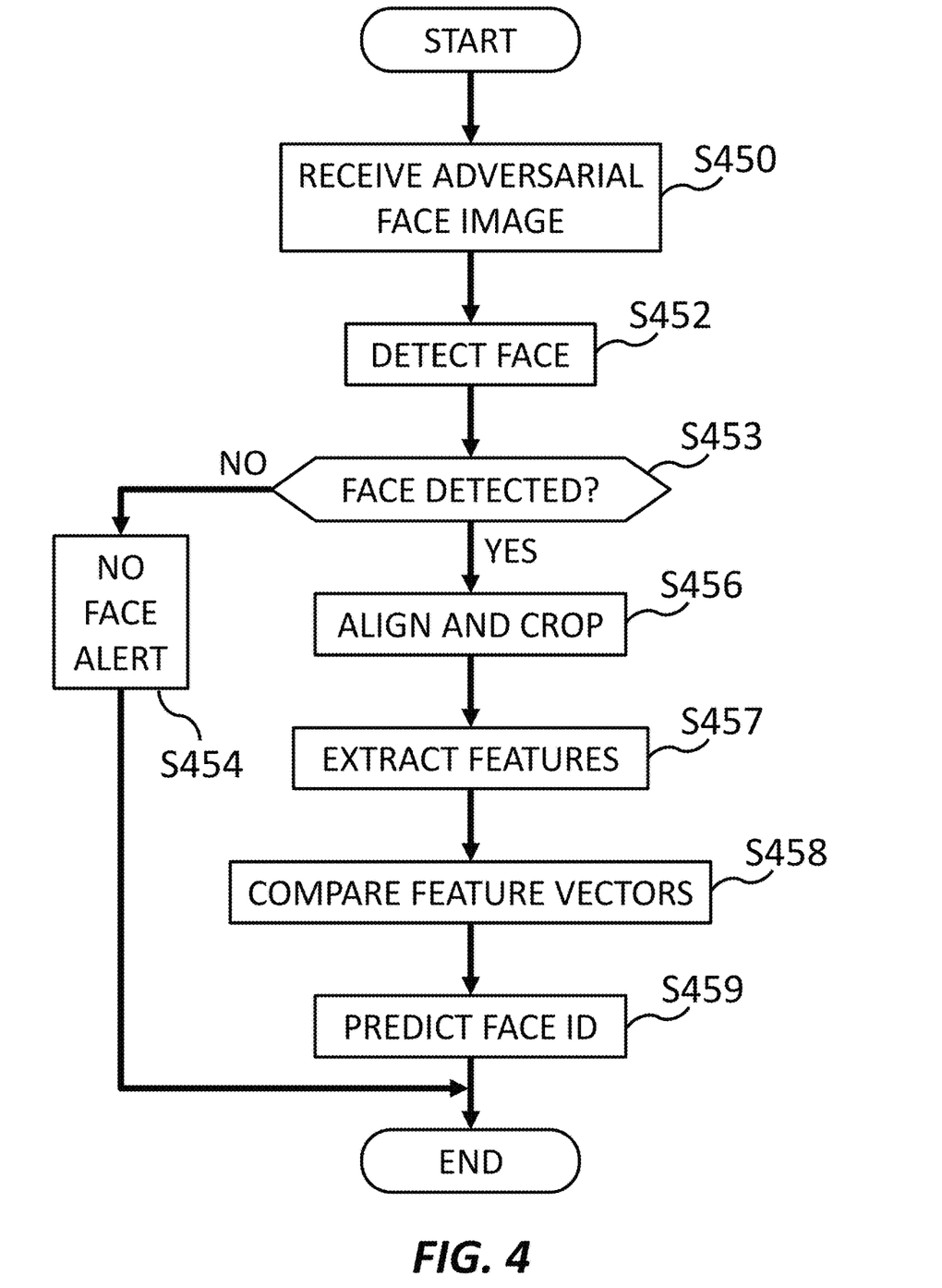
FIG. 4 is an operational flow for facial recognition system application, according to at least some embodiments of the subject disclosure.

At S234, an applying section applies a facial recognition system to one or more adversarial face images. In at least some embodiments, the applying section applies a facial recognition system to the patched image to obtain a recognition result. In at least some embodiments, the applying section applies a target FRS to one or more patched face images to obtain facial recognition results. In at least some embodiments, the applying section applies a facial recognition system to a plurality of patched images to obtain a plurality of recognition results. In at least some embodiments, the FRS application proceeds as shown in FIG. 4, which will be explained hereinafter.

At S236, the controller or a sub-section thereof determines whether a termination condition has been met. In at least some embodiments, the termination condition is met once the applying section has applied all of the adversarial face images generated through iterations of adversarial face image generation at S230. In at least some embodiments, the termination condition is met once the applying section has applied a sufficient number of adversarial face images for an estimating section to be able to estimate a risk value with a reasonable certainty. If the controller determines that the termination condition has not been met, then the operational flow proceeds to next face image selection at S237, and then returns to FRS application at S234. If the controller determines that the termination condition has been met, then the operational flow proceeds to risk estimation at S239.

At S239, an estimating section estimates a risk value for the facial recognition system applied at S234. In at least some embodiments, the estimating section estimates a risk value based on a recognition result. In at least some embodiments, the estimating section estimates the risk value based on the facial recognition results obtained from the iterations of FRS application at S234. In at least some embodiments, the estimating section estimates a risk value based on a number of successful recognition results and a number of unsuccessful recognition results. In at least some embodiments, the estimating section performs the risk estimation by calculating an attack success rate (ASR) for the target FRS. In at least some embodiments, the attack success rate represents a fraction of a number of AXs that succeed against the target FRS out of a total number of AXs fed to the target FRS. In at least some embodiments, the estimating section performs conventional techniques for risk estimation.

FIG. 3 is an operational flow for facial recognition adversarial patch adjustment, according to at least some embodiments of the subject disclosure. The operational flow provides a method of facial recognition adversarial patch adjustment. In at least some embodiments, one or more operations of the method are executed by a generating section of an apparatus, such as the apparatus shown in FIG. 9, which will be explained hereinafter.

At S340, the generating section or a sub-section thereof applies a patch to a face image. In at least some embodiments, the generating section applies a patch to a digital image including image data representing a face to obtain a patched image. In at least some embodiments, the generating section acquires a face image of a selected identity, the selection depending upon the objective, and then adding an initial noise to the face image. In at least some embodiments, the generating section randomly initializes the noise in a predefined patch region of the face image. In at least some embodiments, the predefined patch region takes the shape of eyeglasses, a sticker, a hat, or any other physical object. In at least some embodiments, the predefined patch region covers the entire face image, but the color deviation of the noise is constrained to preserve visibility and clarity of the face. In at least some embodiments, the generating section applies the patch by replacing image data of a partial area of the sample image with image data of the patch.

At S342, the generating section or a sub-section thereof applies a face detector to the patched image. In at least some embodiments, the generating section applies a face detector to the patched image to obtain a detection value representing a likelihood that the patched image includes image data representing facial features. In at least some embodiments, the face detector then predicts the probability of the presence of a face along with a location of the face within the training face image.

At S343, the generating section or a sub-section thereof determines whether a face exists in the patched image. In at least some embodiments, the generating section determines that a face exists in the image in response to determining that the detection value is greater than a reference value. In at least some embodiments, the image data representing the face is located within a window of the digital image, and the face detector outputs a plurality of detection values, each detection value representing a likelihood with respect to a corresponding window among a plurality of windows of the digital image. In at least some embodiments, the generating section compares, with the reference value, the detection value representing a likelihood that the patched image includes image data representing facial features within the window in which the face is located. If the generating section determines that a face exists in the patched image, then the operational flow proceeds to feature extractor application at S344. If the generating section determines that a face does not exist in the patched image, then the operational flow proceeds to loss calculation at S347. In at least some embodiments, the face detector aligns and crops the patched image in response to determining that a face exists in the patched image.

At S344, the generating section or a sub-section thereof applies a feature extractor to the patched image. In at least some embodiments, the generating section applies a feature extractor to the patched image to obtain a feature vector. In at least some embodiments, the feature extractor extracts the deep representative features of the training face image. In at least some embodiments, the feature extractor utilizes deep metric learning to extract unique representative features of a face in the patched face image using pre-trained deep learning models. In at least some embodiments, the generating section applies the feature extractor to one or more target images. In at least some embodiments, the generating section applies the feature extractor to one or more target images before performing the operational flow of FIG. 3.

At S345, the generating section or a sub-section thereof applies a similarity determiner to the feature vector(s) of two images. In at least some embodiments, the generating section applies a similarity determiner to the feature vector and a target feature vector to obtain a similarity value representing a likelihood that the patched image includes image data representing a target face. In at least some embodiments, the generating section applies the similarity determiner to the feature vector of the patched face image and the target feature vector of a particular target image. In at least some embodiments, the generating section applies the similarity determiner to the feature vector of the patched face image and the target feature vector of each target image among a plurality of target images. In at least some embodiments, the generating section applies the similarity determiner to calculate the similarity of the deep representative features of the patched face image against a target face image. In at least some embodiments, the target face image's identity can be the same or different than the identity of the patched face image, depending upon the type of attack to be generated. In at least some embodiments, for evasion attacks, the identity of the patched face image and the target face image is the same because the objective in an evasion attack is to hide the true identity from face classification with an adversarial patch pattern that causes deviation of deep features from deep features of an unpatched face image. In at least some embodiments, for impersonation attacks, the identity of the patched face image is different from the target face image because the objective in an impersonation attack is to imitate the deep features of the target face image with an adversarial patch pattern that causes similarities to deep features in the training face image.

In at least some embodiments, the generating section simultaneously feeds the patched face image to the face detector and the feature extractor. In at least some embodiments, the face detector and the feature extractor are entirely under an attack generation apparatus's control, and thus are referred to as white-box.

At S347, the generating section or a sub-section thereof calculates loss. In at least some embodiments, the generating section calculates a loss based on the detection value and the similarity value. In at least some embodiments, the generating section calculates the loss for the detector and the feature extractor after feeding the patched face image to the face detector and the feature extractor. In at least some embodiments, the generating section calculates a detection loss based on a difference between the obtained detection value and a target detection value. In at least some embodiments, the generating section calculates the detection loss as follows, depending on the attack scenarios:

$$L_{det}^i = (T-Y)^s \quad \text{EQ. 3}$$

$$L_{det}^i = (Y-T)^s \quad \text{EQ. 4}$$

where Y is the predicted probability for the presence of the face in the training image, T is the target detection probability for which the adversarial noise is to be optimized, and s>0 and is a real number. In at least some embodiments, $L_p$-norms can also be used during adjustment for EQ. 3 and 4.

In at least some embodiments, the generating section calculates the detection loss according to a Multi-task Cascaded Convolutional Network (MTCNN) model with cascaded Convolutional Neural Network (CNN) architecture. In at least some embodiments, the MTCNN is built in the form of a three-network cascade: a Proposal Network (P-Net), a Refine Network (R-Net), and an Output Network (O-Net), each of which predicts a face bounding rectangle, the probability that a particular rectangle contains a face, and five landmarks. In at least some embodiments, the detection loss is defined as:

$$L_{det}^i = \Sigma_{k \in 1,2 \ldots m} \Sigma_{l \in 1,2 \ldots n} (K \cdot A - A \cdot Y_{k,l}^i)^s \quad \text{EQ. 5}$$

$$L_{det}^i = \Sigma_{k \in 1,2 \ldots m} \Sigma_{l \in 1,2 \ldots n} (A_{k,l} \cdot Y_{k,l}^i - A_{k,l} \cdot K)^s \quad \text{EQ. 6}$$

where $Y_{k,l}^i$ is the probability of the presence of a face in a P-Net's 12×12 window at (k,l), $$A_{k,l} = \begin{cases} 1 & \text{if } A_{k,l} \geq \delta \\ 0 & \text{else} \end{cases} ;$$

δ is the detection threshold for the P-Net, $m = \lfloor (W-12)/4 \rfloor + 1$, $n = \lfloor (H-12)/4 \rfloor + 1$, and W and H are width and height of the input image to the P-Net of MTCNN.

In at least some embodiments, the concept of detection loss is such that an adjusting section tries to optimize the patch noise during the generation procedure to either increase or decrease the face detection probability in the patched face image, depending on the objective. Interpretation of the detection loss varies with the embodiment of the architecture of the feature detector. In at least some embodiments in which the feature detector is an MTCNN model, the predicted face detection probability of the R-Net or the O-Net are also used. In at least some embodiments, the predicted face detection probability from all the networks in the cascade are combined.

In at least some embodiments, the loss of the feature extractor is utilized to cause misclassification of the patched face image. In at least some embodiments, misclassification can be caused for impersonation objectives or for evasion objectives against a feature extractor. If $X^s$ is a source face image with identity s, X is the patched face image being generated by the generating section with identity s, $X^r$ is a registered image, from which evasion is required, with identity s, $X^t$ is the target image with identity t, and f is the feature extractor and similarity determiner, then the impersonation loss $L_{imper}^i$ and the evasion loss $L_{eva}^i$ in the $i^{th}$ iteration of a gradient descent optimization-based generation process in accordance with at least some embodiments is defined as:

$$L_{imper}^i = \|f(X^r) - f(X^s)\|_p \qquad \text{EQ. 7}$$

$$L_{eva}^i = -\|f(X^r) - f(X^s)\|_p \qquad \text{EQ. 8}$$

where EQ. 7 and EQ. 8 are written for norm-based distance functions. In at least some embodiments, the generating section calculates the loss is based on an additive inverse of the similarity value $f(X^s)$. In at least some embodiments, simple polynomial functions can also be used in EQ. 7 and EQ. 8 while maintaining substantially similar concepts of the loss function. In at least some embodiments, the similarity function can also be used for the impersonation and the evasion loss functions from EQ. 7 and EQ. 8 as:

$$L_{imper}^i = -SIM(f(X^t), f(X^s)) \qquad \text{EQ. 9}$$

$$L_{eva}^i = SIM(f(X^r), f(X^s)) \qquad \text{EQ. 10}$$

In at least some embodiments, the generating section multiplies one of the detection loss and the similarity value by a weighting factor in calculating the loss. In at least some embodiments, the detection and misclassification losses are combined, and the total adversarial loss is computed as:

$$L_{total}^i = \alpha \cdot L_{det}^i + L_{miscls}^i \qquad \text{EQ. 11}$$

where the function of the parameter a is to calculate the weighted sum of the detection $L_{det}^i$ and the misclassification $L_{miscls}^i$ losses, the misclassification loss $L_{miscls}^i$ being either impersonation loss, such as in EQ. 7 or EQ. 9, or evasion loss, such as in EQ. 8 or EQ. 10. In at least some embodiments, other functions can also be used in EQ. 11 to combine the losses.

At S348, the generating section or a sub-section thereof determines whether the patch is ready. In at least some embodiments, the generating section determines that the patch is ready when a termination condition has been met. In at least some embodiments, the termination condition is designed such that the generated adversarial face image meets the adversarial objective. In at least some embodiments, the termination condition is a predefined number of iterations of the operational flow in FIG. 3, a threshold combined loss, or any other measure for the probability of success of the training face image to achieve the adversarial objective calculated in each iteration of the operational flow in FIG. 3. If the generating section or a sub-section thereof determines that the patch is not ready, then the operational flow proceeds to patch adjustment at S349. If the generating section or a sub-section thereof determines that the patch is ready, then the operational flow ends.

At S349, the generating section or a sub-section thereof adjusts the patch based on the loss. In at least some embodiments, the generating section adjusts the patch by adjusting a color of each pixel of the patch according to a gradient based on the loss. In at least some embodiments, the randomized noise of the patch is training patch noise while undergoing adjustment, and the patched face image is a training image. In at least some embodiments, the generating section calculates the detector loss depending upon the adversarial objective so that minimizing the loss results in increase or decrease of the detection probability of the face in the training image through gradient-based optimization. In at least some embodiments, the generating section repeats the operations in FIG. 3 for a number of iterations. In at least some embodiments, as iterations of S349 proceed, the generating section performs gradient-based optimization to train the training patch noise until successful adversarial noise is achieved. In at least some embodiments, the generating section applies Projected Gradient Descent (PGD) based updates to the training patch noise during each iteration. In at least some embodiments, under the PGD method, the gradient of the adversarial loss function is calculated with respect to the color of the training patch noise in the training image. In each iteration, once the generating section has adjusted the training patch, the operational flow returns to patch application at S340, where the generating section applies the adjusted patch of the immediately preceding iteration.

FIG. 4 is an operational flow for facial recognition system application, according to at least some embodiments of the subject disclosure. The operational flow provides a method of facial recognition system application. In at least some embodiments, one or more operations of the method are executed by an applying section of an apparatus, such as the apparatus shown in FIG. 9, which will be explained hereinafter.

At S450, the applying section or a sub-section thereof receives an adversarial face image. In at least some embodiments, the applying section receives an adversarial face image that has undergone the operational flow of FIG. 3.

At S452, the applying section or a sub-section thereof detects whether a face exists in the adversarial face image. In at least some embodiments, the applying section applies a face detector of a target FRS to detect whether a face exists in the adversarial face image. In at least some embodiments, the applying section transmits a digital version of the adversarial face image or presents a live adversarial face image to the face detector of the target FRS.

At S453, the applying section determines whether the face detector detected a face in the adversarial image. In at least some embodiments, the applying section detects a signal or physical output from the face detector of the target FRS that indicates whether a face has been detected. If the applying section determines that the face detector detected a face in the adversarial image, then the operational flow proceeds to alignment and cropping at S456. If the applying section determines that the face detector has not detected a face in the adversarial image, then the operational flow proceeds to "No Face" alert issuance at S454, and the operational flow ends.

At S456, the applying section aligns and crops the adversarial image. In at least some embodiments, the applying section aligns and crops the adversarial face image based on the P-Net in which the face is detected, or in which the detection value is highest. In at least some embodiments, the applying section aligns and crops the adversarial face image so that the detected face is centered, oriented, and occupies a normalized amount of space in the image.

At S457, the applying section extracts features from the aligned and cropped adversarial face image. In at least some embodiments, the applying section applies a feature extractor of the target FRS to extract one or more feature vectors from the adversarial face image. In at least some embodiments, the applying section allows the face detector of the target FRS to transmit the aligned and cropped adversarial face image to the feature extractor of the target FRS.

At S458, the applying section compares a feature vector of the adversarial face image with a feature vector of one or more target face images. In at least some embodiments, the applying section applies a similarity determiner of the target FRS to determine the similarity of feature vectors from the adversarial face image and the target face image(s). In at least some embodiments, the applying section allows the feature extractor of the target FRS to transmit the feature vector to the similarity determiner of the target FRS.

At S459, the applying section predicts a face identifier. In at least some embodiments, the applying section detects a signal or physical output from the target FRS that indicates a face identifier. In at least some embodiments, when the similarity of the adversarial face image's deep features compared to its clean face image's deep features is below FRS's predefined threshold for classification, it causes evasion for the adversarial image from detecting a true identity by the target FRS.

Figure 5:
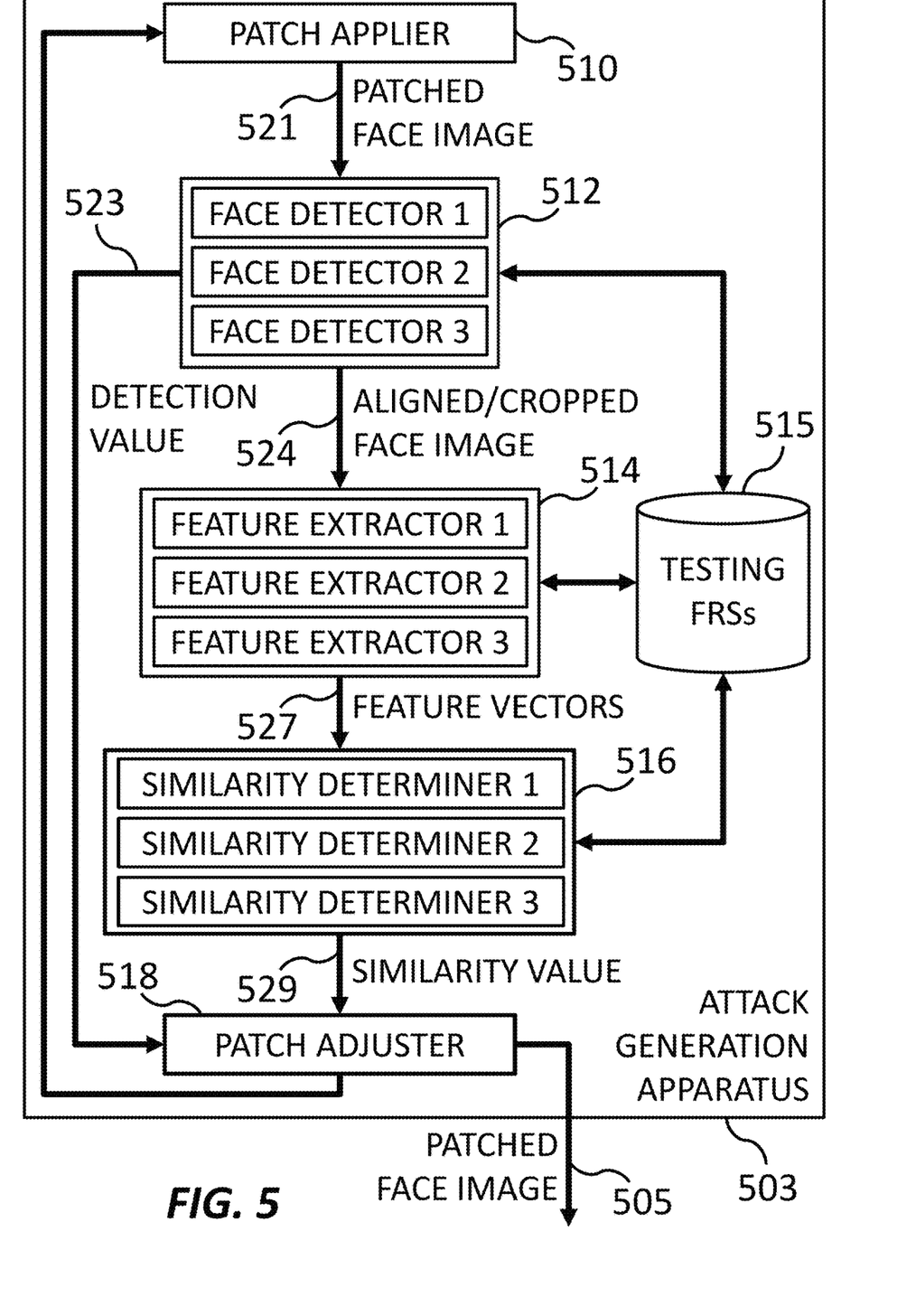
FIG. 5 is a schematic diagram of an apparatus for facial recognition adversarial patch adjustment, according to at least some embodiments of the subject disclosure.

FIG. 5 is a schematic diagram of an apparatus 503 for facial recognition adversarial patch adjustment, according to at least some embodiments of the subject disclosure. Apparatus 503 includes a patch applier 510, a face detector 512, a feature extractor 514, testing FRSs 515, a similarity determiner 516, and a patch adjuster 518. The structures and functions of patch applier 510, face detector 512, feature extractor 514, similarity determiner 516, and patch adjuster 518 are substantially similar to that of patch applier 110, face detector 112, feature extractor 114, similarity determiner 116, and patch adjuster 118 of FIG. 1, except where described differently below.

Face detector 512 includes a first face detector, a second face detector, and a third face detector, each of which is configured to detect a face in patched face image 521 to produce a detection value 523, and, in the event a face is detected, an aligned and cropped face image 524. In at least some embodiments, each of the first face detector, the second face detector, and the third face detector are from different FRSs among testing FRSs 515. Feature extractor 514 includes a first feature extractor, a second feature extractor, and a third feature extractor, each of which is configured to extract features from aligned and cropped face images to produce feature vectors 527. In at least some embodiments, each of the first feature extractor, the second feature extractor, and the third feature extractor are from different FRSs among testing FRSs 515. Similarity determiner 516 includes a first similarity determiner, a second similarity determiner, and a third similarity determiner, each of which is configured to compare feature vectors 527 to produce a similarity value 529. In at least some embodiments, each of the first similarity determiner, the second similarity determiner, and the third similarity determiner are from different FRSs among testing FRSs 515.

In at least some embodiments, an ensemble of face detectors, feature extractors, and/or similarity determiners are used for increasing the transferability of black-box attacks. In such embodiments, patch applier 518 calculates sums of the misclassification losses in EQ. 7, EQ. 8, EQ. 9, and EQ. 10 for patch adjustment. Once a termination condition is met, patch applier 518 produces a patched face image 505.

Figure 6:
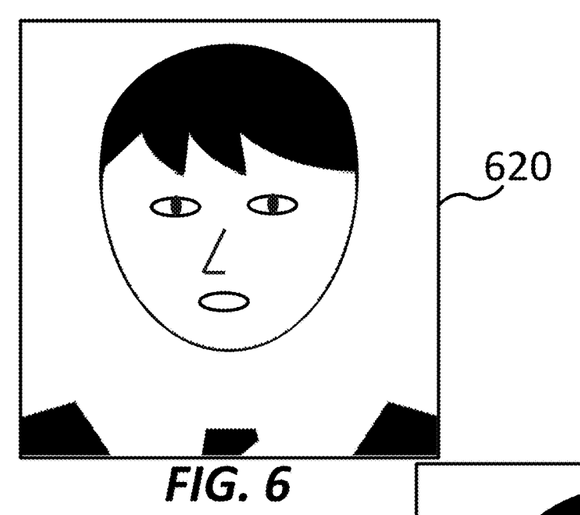
FIG. 6 is a source face image, according to at least some embodiments of the subject disclosure.

FIG. 6 is a source face image 620, according to at least some embodiments of the subject disclosure. In at least some embodiments, an attack generation apparatus, such as attack generation apparatus 103 of FIG. 1, retrieves source face image 620 from among sample face images, such as sample face images 120 of FIG. 1.

Figure 7:
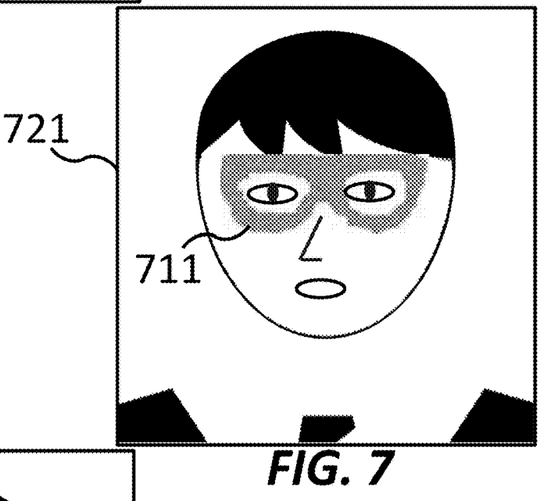
FIG. 7 is an adversarial face image without patch adjustment, according to at least some embodiments of the subject disclosure.

FIG. 7 is an adversarial face image 721 without patch adjustment, according to at least some embodiments of the subject disclosure. In at least some embodiments, a patch applier, such as patch applier 110 of FIG. 1, applies a patch 711 to a source face image having a random distribution of color values. Patch 711 is in the shape of eyeglasses. In at least some embodiments, adversarial face image 721 is not successful against many target FRSs because the patch noise has not been adjusted.

Figure 8:
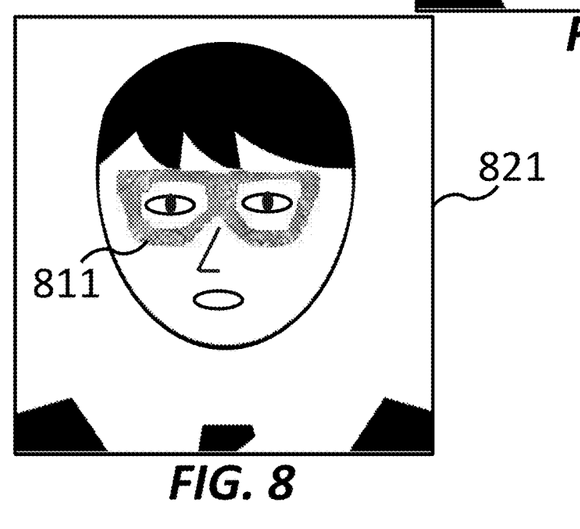
FIG. 8 is an adversarial face image with patch adjustment, according to at least some embodiments of the subject disclosure.

FIG. 8 is an adversarial face image 821 with patch adjustment, according to at least some embodiments of the subject disclosure. In at least some embodiments, a patch adjuster, such as patch adjuster 118 of FIG. 1, adjusts a patch 811 to minimize, over multiple iterations, a loss function based on a detection value and a similarity value of each iteration. In at least some embodiments, adversarial face image 721 is routinely successful against many target FRSs because the patch noise has been adjusted to achieve an objection with respect to face detectors and feature extractors/similarity determiners.

Figure 9:
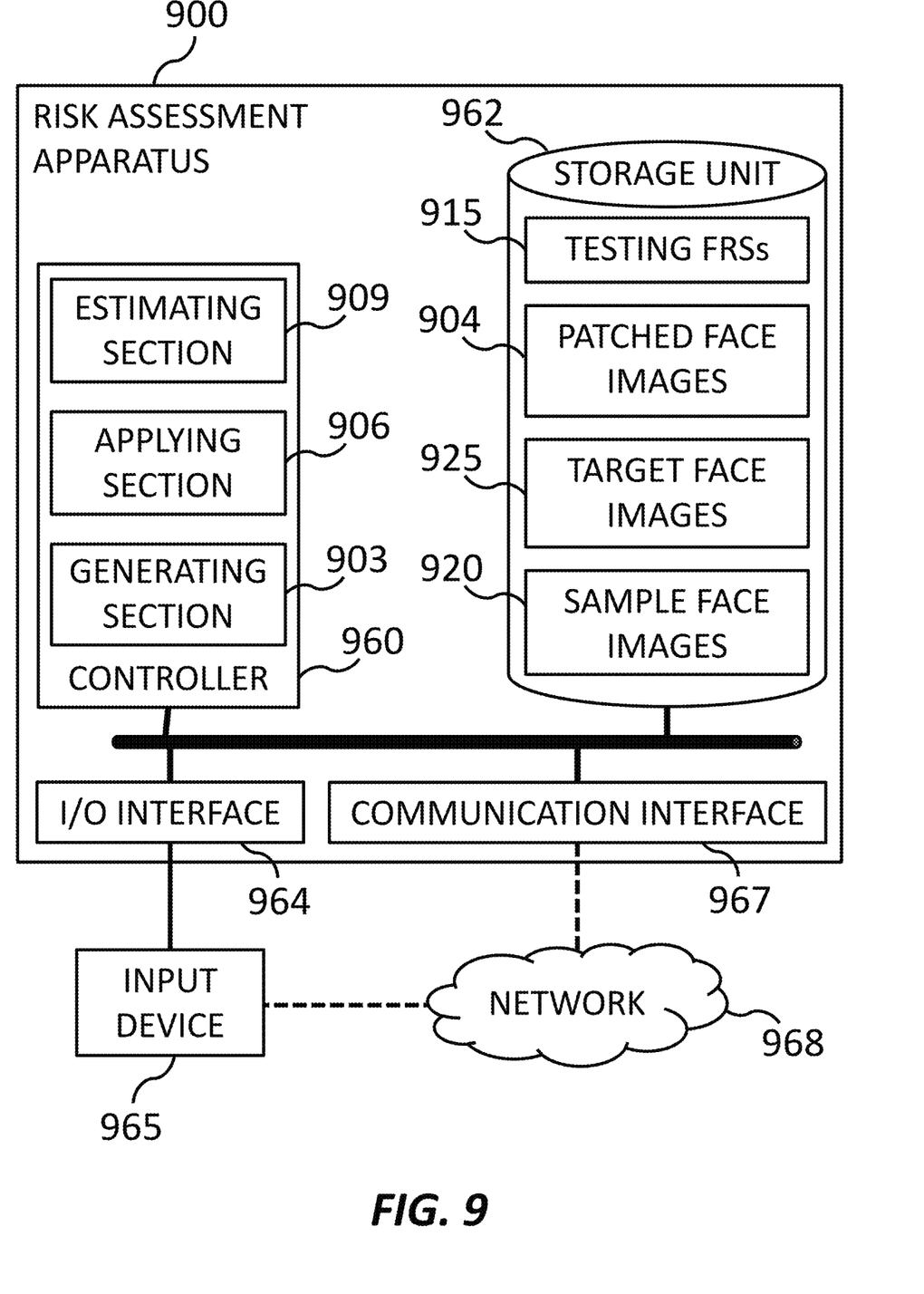
FIG. 9 is a block diagram of a hardware configuration for facial recognition system risk assessment, according to at least some embodiments of the subject disclosure.

FIG. 9 is a block diagram of a hardware configuration for facial recognition system risk assessment, according to at least some embodiments of the subject disclosure.

The exemplary hardware configuration includes risk assessment apparatus 900, which communicates with input device 965 through network 968, and interacts with input device 965. In at least some embodiments, risk assessment apparatus 900 is a computer or other computing device that receives input or commands from input device 965. In at least some embodiments, risk assessment apparatus 900 is a host server that connects directly to input device 965, or indirectly through network 968. In at least some embodiments, risk assessment apparatus 900 is a computer system that includes two or more computers. In at least some embodiments, risk assessment apparatus 900 is a personal computer that executes an application for a user of risk assessment apparatus 900.

Risk assessment apparatus 900 includes a controller 960, a storage unit 962, a communication interface 967, and an input/output interface 964. In at least some embodiments, controller 960 includes a processor or programmable circuitry executing instructions to cause the processor or programmable circuitry to perform operations according to the instructions. In at least some embodiments, controller 960 includes analog or digital programmable circuitry, or any combination thereof. In at least some embodiments, controller 960 includes physically separated storage or circuitry that interacts through communication. In at least some embodiments, storage unit 962 includes a non-volatile computer-readable medium capable of storing executable and non-executable data for access by controller 960 during execution of the instructions. Communication interface 967 transmits and receives data from network 968. Input/output interface 964 connects to various input and output units, such as input device 965, via a parallel port, a serial port, a keyboard port, a mouse port, a monitor port, and the like to accept commands and present information.

Controller 960 includes generating section 903, applying section 906, estimating section 909, and migrating section 1076. Storage unit 962 includes sample face images 920, target face images 925, patched face images 904, and testing FRSs 915.

Generating section 903 is the circuitry or instructions of controller 960 configured to generate adversarial face images. In at least some embodiments, generating section 903 is configured to generate an adversarial face image by applying a patch to a face image, and performing facial recognition adversarial patch adjustment to improve the likelihood of successfully fooling an FRS. In at least some embodiments, generating section 903 utilizes information in storage unit 962, such as sample face images 920, target face images 925, and testing FRSs 915, and also records information in storage unit 962, such as in patched face images. In at least some embodiments, generating section 903 includes sub-sections for performing additional functions, as described in the foregoing flow charts. In at least some embodiments, such sub-sections is referred to by a name associated with a corresponding function.

Applying section 906 is the circuitry or instructions of controller 960 configured to apply an FRS to one or more patched face images. In at least some embodiments, applying section 906 is configured to apply a facial recognition system to the patched image to obtain a recognition result. In at least some embodiments, applying section 906 utilizes information in storage unit 962, such as patched face images 904 and testing FRS s 915. In at least some embodiments, applying section 906 includes sub-sections for performing additional functions, as described in the foregoing flow charts. In at least some embodiments, such sub-sections is referred to by a name associated with a corresponding function.

Estimating section 909 is the circuitry or instructions of controller 960 configured to estimate risk values. In at least some embodiments, estimating section 909 is configured to estimate a risk value based on a number of successful recognition results and a number of unsuccessful recognition results. In at least some embodiments, estimating section 909 utilizes information from storage unit 962, such as target face images 925, patched face images 904, and testing FRSs 915. In at least some embodiments, estimating section 909 includes sub-sections for performing additional functions, as described in the foregoing flow charts. In at least some embodiments, such sub-sections is referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the subject disclosure.

While embodiments of the subject disclosure have been described, the technical scope of any subject matter claimed is not limited to the above described embodiments. Persons skilled in the art would understand that various alterations and improvements to the above-described embodiments are possible. Persons skill in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

According to at least one embodiment of the subject disclosure, facial recognition adversarial patch adjustment is performed by applying a patch to a digital image including image data representing a face to obtain a patched image, applying a face detector to the patched image to obtain a detection value representing a likelihood that the patched image includes image data representing facial features, applying a feature extractor to the patched image to obtain a feature vector, applying a similarity determiner to the feature vector and a target feature vector to obtain a similarity value representing a likelihood that the patched image includes image data representing a target face, calculating a loss based on the detection value and the similarity value, and adjusting the patch based on the loss.

Some embodiments include the instructions in a computer program, the method performed by the processor executing the instructions of the computer program, and an apparatus that performs the method. In some embodiments, the apparatus includes a controller including circuitry configured to perform the operations in the instructions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory computer-readable medium including instructions executable by a computer to cause the computer to perform operations comprising:
   applying a patch to a digital image including image data representing a face to obtain a patched image;
   performing a face detection on the patched image to obtain a detection value representing a likelihood that the patched image includes image data representing facial features;
   performing a feature extraction on the patched image to obtain a feature vector;
   performing a similarity determination on the feature vector and a target feature vector to obtain a similarity value representing a likelihood that the patched image includes image data representing a target face;
   calculating a loss based on the detection value and the similarity value, wherein the calculating the loss includes calculating a detection loss based on a difference between the obtained detection value and a target detection value; and
   adjusting the patch based on the loss.

2. The non-transitory computer-readable medium of claim 1, wherein the loss is based on an additive inverse of the similarity value.

3. The non-transitory computer-readable medium of claim 1, wherein calculating the loss includes multiplying one of the detection loss and the similarity value by a weighting factor.

4. The non-transitory computer-readable medium of claim 1,
   wherein the image data representing the face is located within a window of the digital image;
   wherein the performing the face detection outputs a plurality of detection values, each detection value representing a likelihood with respect to a corresponding window among a plurality of windows of the digital image; and
   wherein the detection value represents a likelihood that the patched image includes image data representing facial features within the window.

5. The non-transitory computer-readable medium of claim 1, wherein the adjusting the patch includes adjusting a color of each pixel of the patch according to a gradient based on the loss.

6. The non-transitory computer-readable medium of claim 5, wherein the applying the patch includes replacing image data of a partial area of the sample image with image data of the patch.

7. The non-transitory computer-readable medium of claim 5,
   wherein the operations are repeated for a number of iterations;
   wherein the applied patch of each iteration is the adjusted patch of an immediately preceding iteration.

8. The non-transitory computer-readable medium of claim 7, further comprising:
    performing a facial recognition on the patched image to obtain a recognition result; and
estimating a risk value based on the recognition result.

9. The non-transitory computer-readable medium of claim 7, further comprising:
    applying a facial recognition system to a plurality of patched images to obtain a plurality of recognition results; and
    estimating a risk value based on a number of successful recognition results and a number of unsuccessful recognition results.

10. A method comprising:
    applying a patch to a digital image including image data representing a face to obtain a patched image;
    performing a face detection on the patched image to obtain a detection value representing a likelihood that the patched image includes image data representing facial features;
    performing a feature extraction on the patched image to obtain a feature vector;
    performing a similarity determination on the feature vector and a target feature vector to obtain a similarity value representing a likelihood that the patched image includes image data representing a target face;
    calculating a loss based on the detection value and the similarity value, wherein the calculating the loss includes calculating a detection loss based on a difference between the obtained detection value and a target detection value; and
    adjusting the patch based on the loss.

11. The method of claim 10, wherein calculating the loss includes multiplying one of the detection loss and the similarity value by a weighting factor.

12. The method of claim 10, wherein the adjusting the patch includes adjusting a color of each pixel of the patch according to a gradient based on the loss.

13. The method of claim 12,
    wherein the operations are repeated for a number of iterations;
    wherein the applied patch of each iteration is the adjusted patch of an immediately preceding iteration.

14. The method of claim 13, further comprising:
    performing a facial recognition on the patched image to obtain a recognition result; and
    estimating a risk value based on the recognition result.

15. An apparatus comprising:
    a controller including circuitry configured to:
        apply a patch to a digital image including image data representing a face to obtain a patched image;
        perform a face detection on the patched image to obtain a detection value representing a likelihood that the patched image includes image data representing facial features;
        perform feature extraction on the patched image to obtain a feature vector;
        perform similarity determination on the feature vector and a target feature vector to obtain a similarity value representing a likelihood that the patched image includes image data representing a target face;
        calculate a loss based on the detection value and the similarity value, wherein the calculating the loss includes calculating a detection loss based on a difference between the obtained detection value and a target detection value; and
        adjust the patch based on the loss.

16. The apparatus of claim 15, wherein calculating the loss includes multiplying one of the detection loss and the similarity value by a weighting factor.

17. The apparatus of claim 15, wherein the adjusting the patch includes adjusting a color of each pixel of the patch according to a gradient based on the loss.

* * * * *